US008864686B2

United States Patent
Roche et al.

(10) Patent No.: US 8,864,686 B2
(45) Date of Patent: *Oct. 21, 2014

(54) VIRTUAL MAPPING OF AN ANATOMICAL PIVOT POINT AND ALIGNMENT THEREWITH

(75) Inventors: Martin Roche, Fort Lauderdale, FL (US); Marc Boillot, Plantation, FL (US); Jason McIntosh, Sugar Hill, GA (US)

(73) Assignee: Orthosensor Inc., Dania Beach, FL (US)

( * ) Notice: Subject to any disclaimer, the term of this patent is extended or adjusted under 35 U.S.C. 154(b) by 1108 days.

This patent is subject to a terminal disclaimer.

(21) Appl. No.: 12/853,987

(22) Filed: Aug. 10, 2010

(65) Prior Publication Data

US 2011/0060220 A1    Mar. 10, 2011

Related U.S. Application Data

(63) Continuation-in-part of application No. 11/566,148, filed on Dec. 1, 2006, now Pat. No. 7,788,607.

(60) Provisional application No. 60/741,368, filed on Dec. 1, 2005, provisional application No. 61/291,725, filed on Dec. 31, 2009.

(51) Int. Cl.
| | | |
|---|---|---|
| *G01S 1/72* | (2006.01) | |
| *G01S 1/80* | (2006.01) | |
| *A61B 5/103* | (2006.01) | |
| *A61B 8/00* | (2006.01) | |
| *G06F 3/0484* | (2013.01) | |
| *G06F 3/0346* | (2013.01) | |
| *G06F 3/01* | (2006.01) | |
| *G06F 3/0354* | (2013.01) | |

(52) U.S. Cl.
CPC ............ *G06F 3/017* (2013.01); *G06F 3/04847* (2013.01); *G06F 3/0346* (2013.01); *G06F 3/03545* (2013.01)
USPC ........... 600/587; 345/156; 345/158; 367/117; 367/118; 367/124; 367/125; 600/447

(58) Field of Classification Search
USPC ........... 600/447; 345/156, 158; 367/117, 118, 367/124, 125
See application file for complete search history.

(56) References Cited

U.S. PATENT DOCUMENTS

| | | |
|---|---|---|
| 6,546,277 B1 | 4/2003 | Franck et al. |
| 6,558,391 B2 | 5/2003 | Axelson, Jr. et al. |
| 6,827,723 B2 | 12/2004 | Carson |
| 6,932,823 B2 | 8/2005 | Grimm et al. |
| 7,085,400 B1 | 8/2006 | Holsing et al. |
| 7,139,418 B2 | 11/2006 | Abovitz et al. |
| 7,309,339 B2 | 12/2007 | Cusick |

(Continued)

*Primary Examiner* — Michael Rozanski

(57) ABSTRACT

A system and method is provided for resolving a pivot point via touchless interaction. It applies to situations where one end of a rigid object is inaccessible but remains stationary at a pivot point, while the other end is free to move and is accessible to an input pointing device. As an example, the rigid object can be a leg bone where the proximal end is at the hip joint and the distal end is at the knee. The system comprises a wand and a receiver that are spatially configurable to touchlessly locate the pivot point without contact. The receiver tracks a relative displacement of the wand and geometrically resolves the location of the pivot point by a spherical mapping. The system can use a combination of ultrasonic sensing and/or accelerometer measurements. Other embodiments are disclosed.

20 Claims, 5 Drawing Sheets

(56) References Cited

U.S. PATENT DOCUMENTS

| | | |
|---|---|---|
| 7,366,562 B2 | 4/2008 | Dukesherer et al. |
| 7,392,076 B2 | 6/2008 | Moctezuma de La Barrera |
| 7,395,181 B2 | 7/2008 | Foxlin |
| 7,427,272 B2 | 9/2008 | Richard et al. |
| 7,458,977 B2 | 12/2008 | McGinley et al. |
| 7,477,926 B2 | 1/2009 | McCombs |
| 7,525,309 B2 | 4/2009 | Sherman et al. |
| 7,547,307 B2 | 6/2009 | Carson et al. |
| 7,559,931 B2 | 7/2009 | Stone |
| 7,604,645 B2 | 10/2009 | Barzell et al. |
| 7,636,595 B2 | 12/2009 | Marquart |
| 7,657,298 B2 | 2/2010 | Moctezuma de la Barrera et al. |
| 7,660,623 B2 | 2/2010 | Hunter et al. |
| 7,681,448 B1 | 3/2010 | Preston et al. |
| 7,685,861 B2 | 3/2010 | Lynch et al. |
| 7,686,812 B2 | 3/2010 | Axelson, Jr. et al. |
| 7,689,032 B2 | 3/2010 | Strassenburg-Kleciak |
| 7,747,311 B2 | 6/2010 | Quaid |
| 7,751,865 B2 | 7/2010 | Jascob et al. |
| 7,764,985 B2 | 7/2010 | McCombs et al. |
| 2004/0024309 A1 | 2/2004 | Ferre et al. |
| 2004/0236424 A1 | 11/2004 | Berez et al. |
| 2004/0254584 A1 | 12/2004 | Sarin et al. |
| 2006/0015120 A1 | 1/2006 | Richard et al. |
| 2007/0129629 A1 | 6/2007 | Beauregard et al. |
| 2008/0269599 A1 | 10/2008 | Csavoy et al. |
| 2011/0032184 A1* | 2/2011 | Roche et al. .................. 345/156 |

\* cited by examiner

500

VIRTUAL MAPPING OF AN ANATOMICAL PIVOT POINT AND ALIGNMENT THEREWITH

CROSS-REFERENCE TO RELATED APPLICATION

This application is a Continuation-In-Part of U.S. Pat. No. 7,788,607 filed on Dec. 1, 2006 claiming the priority benefit of U.S. Provisional Patent Application No. 60/741,368 filed on Dec. 1, 2005, the entire contents of which are hereby incorporated by reference. This application also claims priority benefit to Provisional Patent Application No. 61/291,725 filed on Dec. 31, 2009, the entire contents of which are hereby incorporated by reference.

BACKGROUND

1. Field

The present embodiments of the invention generally relate to the field of ultrasonic sensing, and more particularly to input pointing devices.

2. Introduction

Input pointing devices permit pointing to a point of interest in two- or three-dimensions. Input pointing devices can be used to map coordinates to a virtual display for providing sophisticated user interaction. Within a navigation system, the utility of the input pointing device is a function of the sensing technology.

An optical camera system generally processes captured images to determine the pointed location. An electromagnetic system generally evaluates changes in magnetic field strength. An ultrasonic system generally processes ultrasonic signals to resolve the pointed location.

Navigation systems and other sensing technologies generally require the pointing device to touch the point of interest. There are cases when the point of contact is not directly accessible and a touchless interaction is preferable.

DETAILED DESCRIPTION

Figure 1:
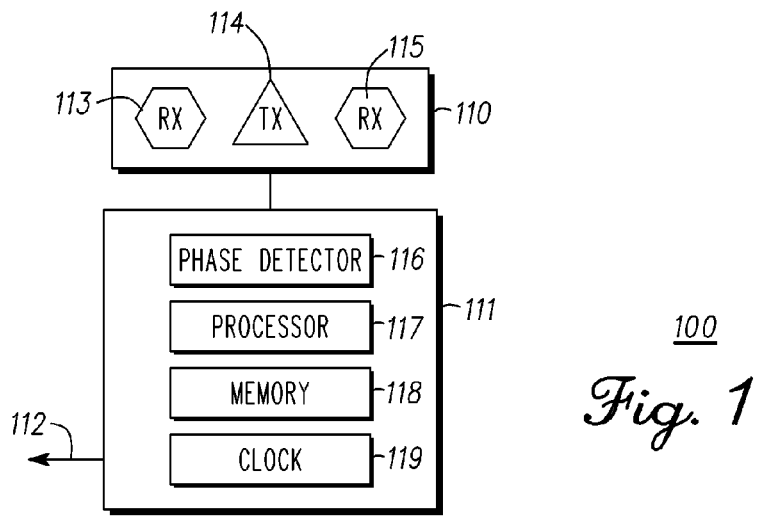
FIG. 1 is an ultrasonic device for tracking object movement and position in accordance with one embodiment.

While the specification concludes with claims defining the features of the invention that are regarded as novel, it is believed that the invention will be better understood from a consideration of the following description in conjunction with the drawing figures, in which like reference numerals are carried forward.

Broadly stated, a system and method is provided for touchlessly resolving a pivot point. Such need applies to situations where one end of a rigid object is inaccessible, but remains stationary at a pivot point, while the other end is free to move, and is accessible to an input pointing device. The system comprises a wand and a receiver that are spatially configurable to touchlessly locate the pivot point without direct contact. The wand and receiver uniquely track each others relative displacement to geometrically resolve the location of the pivot point. As one example, the pivot point is a hip joint and the rigid object is a femur bone with one end at the hip joint and the other end free to move.

In a first embodiment, a method for determining an anatomical pivot point includes transmitting ultrasonic signals from an ultrasonic wand to an ultrasonic receiver, determining paired transmit-receive ranges between the ultrasonic wand and the ultrasonic receiver, tracking the ultrasonic wand by way of, and relative to, the ultrasonic receiver during constrained rotational and translational movement at the first end, calculating a three-dimensional displacement and orientation time trajectory relative to the ultrasonic receiver, generating a hemispherical surface representation of the constrained bone movement at the first end, and calculating the pivot point of the second end of the bone from the hemispherical surface representation.

In a second embodiment, a method for determining an anatomical pivot point includes producing a three-dimensional acceleration surface according to changes in a local orientation of the ultrasonic receiver, generating a hemispherical surface representation of constrained rotational and translational movement at the first end from the three-dimensional acceleration surface, and calculating, relative to the ultrasonic receiver, a pivot point of the bone from the hemispherical surface representation of the three-dimensional acceleration surface.

In a third embodiment, a system for determining an anatomical pivot point and alignment includes an ultrasonic wand and an ultrasonic receiver. The ultrasonic system requires one-dimensional processing of ultrasonic signals which make it a low-cost and low-power hand-held navigation device that can also be disposed after use. The system can be integrated with a remote system to display a user interface workflow for navigated surgery, including, cutting jig alignment and reporting range of motion. The system can incorporate acceleration data to generate local alignment vectors between the pivot point and one or more registered points or cutting jigs.

Referring to FIG. 1, an ultrasonic device 100 is shown. The ultrasonic device 100 includes a sensing unit 110 for creating an ultrasonic sensing space, and a controller 111 for operating the sensing unit 110. The ultrasonic device 100 detects movement and location of an object in the ultrasonic sensing space 101. A display 112 can be coupled to the ultrasonic device 100 for showing the movement or position of the object. The sensing unit 110 can include an ultrasonic transmitter 114, a first receiver 113 and a second receiver 115 for sensors. The sensors can be ultrasonic transducers, acoustic microphones, Micro Electro Mechanical Element (MEMS) microphones, or other acoustic sensors for converting a physical media to an electric signal such as a voltage or current.

The sensors can be an array (e.g., line, rows, cols, etc.) or other arranged pattern (e.g., cross, triangle, circle, etc.) of sensing elements. As one example, the sensing element can be ultrasonic for transmitting and receiving ultrasonic signals. In another arrangement, the sensing element can be an array of microphones and speakers for transmitting and receiving ultrasonic and audio signals. In one arrangement, the ultrasonic device 100 can employ pulse-echo detection of reflected ultrasonic signals for determining its orientation with respect to an object within its proximity and for touchless sensing. The controller 111 can be an Application Specific Integrated Circuit (ASIC) or Field Programmable Gate Array (FPGA) or other fabricated electronic or analog component. In another arrangement, the sensing element can further include CCD camera elements or MEMS camera elements for processing light, and temperature sensors for monitoring temperature.

The ultrasonic device 100 can include, but is not limited to, a phase detector 116, a processor 117, a memory 118, and a clock 119. The sensing unit 110 can be integrated within the ultrasonic device 100, or apart from it. The phase detector 116 can be cooperatively connected to the sensing unit 110 for processing transmitted and received ultrasonic signals. The phase detector 116 can be coupled to the processor 117 for calculating phase differences among multiple receive signals. The processor 117 can process these phase differences for estimating a movement the object in the sensing space 101.

Figure 2A:
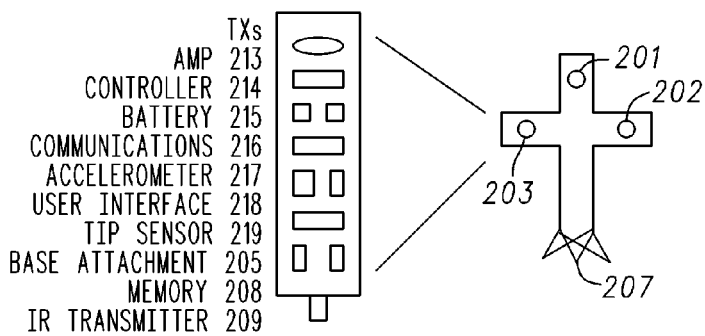
FIG. 2A is an ultrasonic wand for establishing a stationary tracking reference and registering points of interests in accordance with one embodiment.
Figure 2B:
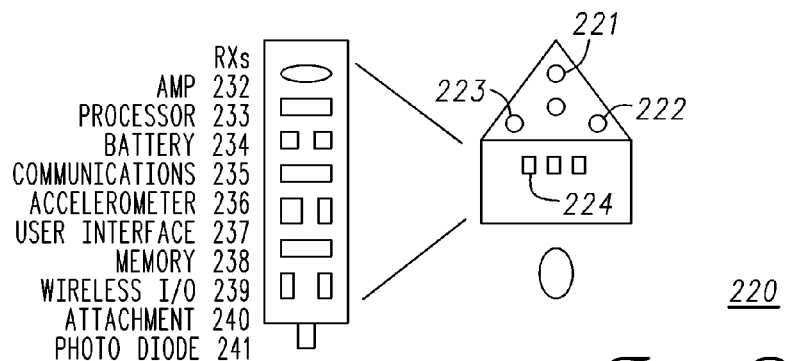
FIG. 2B is an ultrasonic receiver for tracking an orientation and location with respect to the ultrasonic wand in accordance with one embodiment.

In one arrangement the ultrasonic device 100 can be partitioned out to an ultrasonic wand and a ultrasonic receiver to respectively separate the transmit operation from the receive operation. In this configuration, a system for positional measurement via ultrasonic tracking is provided. FIG. 2A illustrates one embodiment of a ultrasonic wand 200 with TXs (transmit sensors) 201-203 to provide transmit operation. FIG. 2B illustrates one embodiment of a ultrasonic receiver 220 with RXs (receive sensors) 221-222 to provide receive operation.

FIG. 2A shows the ultrasonic wand 200 comprising three ultrasonic transmitters 201-203 for each transmitting a first, second and third ultrasonic signals through the air, an electronic circuit (or controller) 214 for generating driver signals to the three ultrasonic transmitters 201-203 for generating the first, second and third ultrasonic signals, an user interface 218 that receives user input for performing short range positional measurement and alignment determination, a communications port 216 for relaying the user input and receiving timing information to control the electronic circuit 214, and a battery 215 for powering the electronic circuit 215 and associated electronics on the ultrasonic wand 200. The ultrasonic wand 200 may contain more or less than the number of components shown; certain component functionalities may be shared as integrated devices.

Additional ultrasonic transmitter sensors can be included to provide an over-determined system for three-dimensional sensing. The ultrasonic sensors can be MEMS microphones, ultrasonic receivers, ultrasonic transmitters or combination thereof. As one example, each ultrasonic transducer can perform separate transmit and receive functions. One such example of an ultrasonic sensor is disclosed in U.S. patent application Ser. No. 11/683,410 entitled "Method and Device for Three-Dimensional Sensing" filed Mar. 7, 2007 the entire contents of which are hereby incorporated by reference. The ultrasonic sensor can transmit pulse shaped waveforms in accordance with physical characteristics of a customized transducer for constructing and shaping waveforms.

The wand tip 207 identifies points of interest on a structure, for example, a rod, bone, instrument or jig in three-dimensional space. The tip does not require ultrasonic transducers since its spatial location in three-dimensional space is established by the three ultrasonic transmitters 201-203 arranged at the cross ends. An ultrasonic element can however be integrated on the tip 207 to provide ultrasound capabilities (e.g., structure boundaries, depth, etc.) The wand tip 207 may include up to three (interchangeable, detachable or multi-headed) stylus tips for permitting the wand tip to identify anatomical features while the transmitters remain in line-of-sight with the ultrasonic receiver 220. These stylus tips may be right angled, curved, or otherwise contoured in fashion of a dental pick to point to difficult to touch locations. This permits the wand to be held in the hand to identify via the tip 207, points of interest such as (anatomical) features on the structure, bone or jig. The tip 207 can be touch sensitive to registers points responsive to a physical action, for example, touching the tip to an anatomical or structural location. The tip can comprise a mechanical accelerometer or actuated spring assembly for such purpose. In another arrangement it includes a capacitive touch tip or electrostatic assembly for registering touch.

The user interface 218 can include one or more buttons to permit handheld operation and use (e.g., on/off/reset button) and illumination elements to provide visual feedback. The ultrasonic wand 200 may further include a haptic module with the user interface 218. As an example, the haptic module may change (increase/decrease) vibration to signal improper or proper operation. The ultrasonic wand 200 provides material to cover the transmitters 201-202 to be transparent to sound (e.g., ultrasound) and light (e.g., infrared) yet impervious to biological material such as water, blood or tissue. In one arrangement, a clear plastic membrane (or mesh) is stretched taught; it may vibrate under resonance with a transmitted frequency. The battery 215 can be charged via wireless energy charging (e.g., magnetic induction coils and super capacitors).

The ultrasonic wand 100 can include a base attachment mechanism 205 for coupling to a structure, bone or a jig. As one example, the mechanism can be a magnetic assembly with a fixed insert (e.g., square post head) to permit temporary detachment. As another example, it can be a magnetic ball and joint socket with latched increments. As yet another example, it can be a screw post to an orthopedic screw. Other embodiments may permit sliding, translation, rotation, angling and lock-in attachment and release, and coupling to standard cutting jigs by way of existing notches, ridges or holes.

The ultrasonic wand 200 can further include an amplifier 213 and the accelerometer 217. The amplifier enhances the signal to noise ratio of transmitted or received signals. The accelerometer 217 identifies 3 and 6 axis tilt during motion and while stationary. The communications module 216 may include components (e.g., synchronous clocks, radio frequency 'RF' pulses, infrared 'IR' pulses, optical/acoustic pulse) for signaling to the ultrasonic receiver 220 (FIG. 2B). The controller 214, can include a counter, a clock, or other analog or digital logic for controlling transmit and receive synchronization and sequencing of the sensor signals, accelerometer information, and other component data or status. The battery 215 powers the respective circuit logic and components. The infrared transmitter 209 pulses an infrared timing signal that can be synchronized with the transmitting of the ultrasonic signals (to the ultrasonic receiver).

The controller 214 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm. The controller can be an embedded platform running one or more modules of an operating system (OS). In one arrangement, the storage memory may store one or more sets of instructions (e.g., software) embodying any one or more of the methodologies or functions described herein.

FIG. 2B shows an ultrasonic receiver 220 comprising a processor 233 for generating timing information, registering a pointing location of the ultrasonic wand 200 responsive to the user input, and determining short range positional measurement and alignment from three or more pointing locations of the ultrasonic wand 200 with respect to the ultrasonic receiver 220. It includes a communications interface 235 for transmitting the timing information to the ultrasonic wand 200 that in response transmits the first, second and third ultrasonic signals. The ultrasonic signals can be pulse shaped signals generated from a combination of amplitude modulation, frequency modulation, and phase modulation. Three microphones 221-223 each receive the first, second and third pulse shaped signals transmitted through the air. The memory 238 stores the first, second and third ultrasonics signals and can produce a history of ultrasonic signals or processed signals. It can also store wand tip positions, for example, responsive to a user pressing the button to register a location. The wireless communication interface (Input/Output) 239 wirelessly conveys the positional information and the short range alignment of the three or more pointing locations to a remote system. The remote system can be a computer, laptop or mobile device that displays the positional information and alignment information in real-time as described ahead. The battery powers the processor 233 and associated electronics on the ultrasonic receiver 220. The ultrasonic receiver 200 may contain more or less than the number of components shown; certain component functionalities may be shared or therein integrated.

Additional ultrasonic sensors can be included to provide an over-determined system for three-dimensional sensing. The ultrasonic sensors can be MEMS microphones, ultrasonic receivers, ultrasonic transmitters or combination thereof. As one example, each ultrasonic transducer can perform separate transmit and receive functions. One such example of an ultrasonic sensor is disclosed in U.S. patent application Ser. No. 11/683,410 entitled "Method and Device for Three-Dimensional Sensing" the entire contents of which are hereby incorporated by reference. The ultrasonic receiver 220 can also include an attachment mechanism 240 for coupling to bone or a jig. As one example, the mechanism 240 can be a magnetic assembly with a fixed insert (e.g., square post head) to permit temporary detachment. As another example, it can be a magnetic ball and joint socket with latched increments.

The ultrasonic receiver 220 can further include an amplifier 232, the communications module 235, an accelerometer, and processor 233. The amplifier 232 enhances the signal to noise of transmitted or received signals. The processor 233 can include a controller, counter, a clock, and other analog or digital logic for controlling transmit and receive synchronization and sequencing of the sensor signals, accelerometer information, and other component data or status. The accelerometer 236 identifies axial tilt (e.g., 3/6 axis) during motion and while stationary. The battery 234 powers the respective circuit logic and components. The ultrasonic receiver includes a photo diode 241 for detecting the infrared signal and establishing a transmit time of the ultrasonic signals to permit wireless infrared communication with the ultrasonic wand.

The communications module 235 can include components (e.g., synchronous clocks, radio frequency 'RF' pulses, infrared 'IR' pulses, optical/acoustic pulse) for local signaling (to wand 102). It can also include network and data components (e.g., Bluetooth, ZigBee, Wi-Fi, GPSK, FSK, USB, RS232, IR, etc.) for wireless communications with a remote device (e.g., laptop, computer, etc.). Although external communication via the network and data components is herein contemplate, it should be noted that the ultrasonic receiver 220 can include a user interface 237 to permit standalone operation. As one example, it can include 3 LED lights 224 to show three or more wand tip pointing location alignment status. The user interface 237 may also include a touch screen or other interface display with its own GUI for reporting positional information and alignment.

The processor 233 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the terminal device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm or control logic. The processor can be an embedded platform running one or more modules of an operating system (OS). In one arrangement, the storage memory 238 may store one or more sets of instructions (e.g., software) embodying any one or more of the methodologies or functions described herein.

Figure 3:
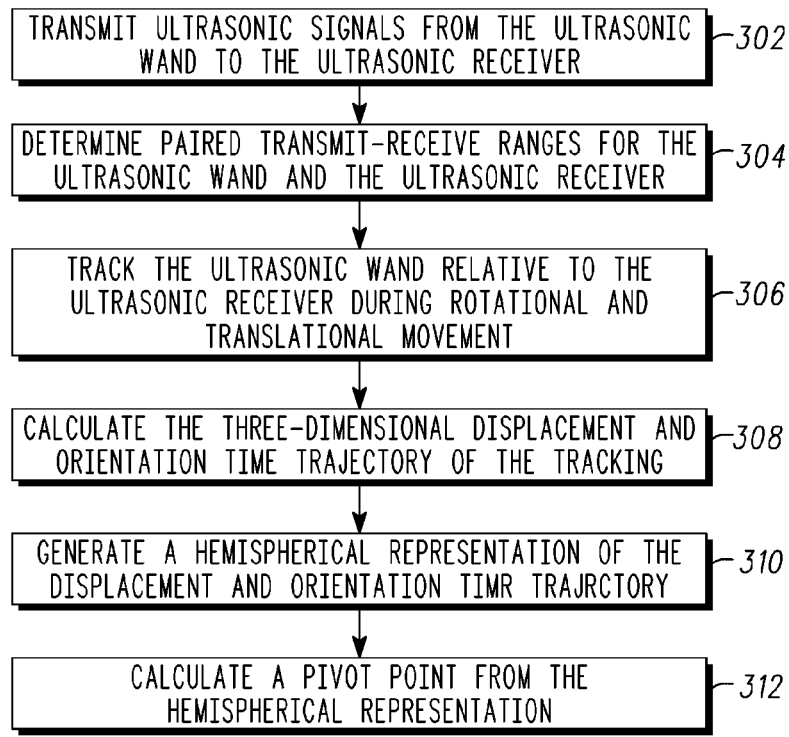
FIG. 3 is a method for determining via ultrasonic positional sensing an anatomical pivot point in accordance with one embodiment.

Referring to FIG. 3 a method 300 for determining an anatomical pivot point and alignment therewith is shown according to one embodiment. When describing the method 300, reference will be made to FIGS. 2A, 2B, 4A and 4B although the method 300 can be practiced in any other suitable system or device. Moreover, the steps of the method 300 are not limited to the particular order in which they are presented in FIG. 3. The method can also have a greater number of steps or a fewer number of steps than those shown in FIG. 3.

Figure 4A:
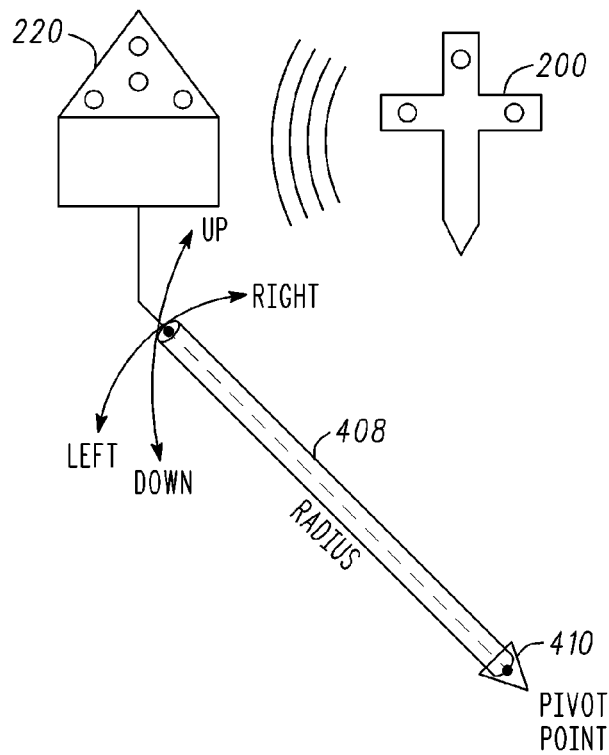
FIG. 4A is an illustration of a system for resolving an anatomical pivot point comprising the ultrasonic wand and ultrasonic receiver in accordance with one embodiment.

At step 302, the ultrasonic wand 200 transmits ultrasonic signals to the ultrasonic receiver 220. It can do this independently, or by directive, from the ultrasonic receiver. In one arrangement, as shown in FIG. 4A, the ultrasonic receiver 220 is attached to a first end of a bone, where the bone comprises two ends, and a second end of the bone is sufficiently stationary at pivot point 410. The first end can be a region midway on the bone down to the distal endpoint, for example, the distal femur near the knee. The second end can be the region midway on the bone up to the proximal endpoint, for example, the femur head region near the hip. The ultrasonic receiver 220 can synchronize a transmit pulsing of the ultrasonic signals from the ultrasonic wand 200 and incorporate timing of the synchronized transmit pulsing as part of method 300 to measure its location and orientation.

Three or more transmitters on the ultrasonic wand 200 perform a sequence of transmissions that occur simultaneously, staggered in time (e.g., delayed transmit) or a combination thereof. Each transmitter can transmit at a same frequency (e.g., 40 KHz) and at different frequencies (e.g., 40, 64, 80, 120 KHz). Different fundamental frequency transmit timing patterns are based on predetermined interference patterns—due to constructive and deconstructive interference of the ultrasonic energy waves. Accordingly, the transmit duration (amount of time the transmitter is vibrating) can be set as a function of the frequencies and timing sequence. Given the speed of sound at 343 m/s, the TOF measurement establishes the distance from each transmitter on the ultrasonic wand 200 to the corresponding receivers (microphones) on the ultrasonic receiver 220 during the movement.

With regard to the components of FIG. 2A, the transmitter 201 receives from the controller 214 a driver signal that describes the transmit shape to be transmitted. As one example the shape can be a square wave that causes a transducer of the transmitter 201 to resonate. In another arrangement, the driver signal can be a frequency modulated or amplitude modulated driver signal provided by the controller 214. One such example of pulse shaping is taught in U.S. Pat. No. 7,414,705 entitled "Method and System for Range Measurement" the entire contents of which are hereby incorporated by reference. Alternatively, timing information provided to the controller 214 from the receiver 302 can include pulse shape information or pulse shape parameters in real-time; that is, the ultrasonic receiver 220 directs the ultrasonic wand 200 to transmit ultrasonic pulse signals with a specified shape and at a specified time. The shaping comprises generating an amplitude modulated region, frequency modulated region, constant frequency region, phase modulated region, a chirp region, or a combination thereof.

At step 304, the ultrasonic receiver 220 determines paired transmit-receive ranges from the ultrasonic wand 200 by weighted time of flight (TOF) and phase differential measurements of the ultrasonic signals captured and processed at the ultrasonic receiver 200. The weighting can be a linear or non-linear function of the distance and orientation between the ultrasonic wand 200 and ultrasonic receiver 220. The direct time of flight and phase differential measurements can be weighted according to a relative location of the ultrasonic wand with respect to a location of the ultrasonic receiver, for example, in accordance with a sound map discussed ahead. One such example of applying weighted differences is taught in U.S. patent application Ser. No. 11/562,404 entitled "Method and System for Object Control", the entire contents of which are hereby incorporated by reference The receiver 220 estimates a location of the wand 200 to produce an estimated location from a sequence of ultrasonic Time of Flight (TOF) measurements from ultrasonic signals transmitted from the wand 200 to the receiver 220. The estimated location is a point in three-dimensional (3D) space (e.g., <x,y,z>). The ultrasonic wand 200 can adjust the sequence pattern as a function of the movement detected by the accelerometer, for example, when it is moving or held still. The time of flight is a round trip time, that accounting for processing delays, is calculated between when an ultrasonic signal is transmitted from the ultrasonic wand 200 to when it is received (arrives) at the ultrasonic receiver 220. Threshold and logic gates in hardware and software can determine when it is received (detected). One such example of detecting arrival time is taught in U.S. patent application Ser. No. 12/764,072 entitled "Method and System for Positional Measurement using Ultrasonic Sensing" the entire contents of which are hereby incorporated by reference.

In a first arrangement, the ultrasonic receiver 220 is wired via a tethered electrical connection (e.g., wire) to the ultrasonic wand 200. That is, the communications port of the ultrasonic wand 200 is physically wired to the communications interface of the ultrasonic receiver 220 for receiving timing information. The timing information from the ultrasonic receiver 220 tells the ultrasonic wand 200 when to transmit and includes optional parameters that can be applied to the ultrasonic signal for pulse shaping. The processor on the ultrasonic receiver 220 employs this timing information to establish first, second and third Time of Flight measurements with respect to a reference time base.

In a second arrangement, the ultrasonic receiver 220 is communicatively coupled to the ultrasonic wand 200 via a wireless signaling connection. An infrared transmitter 209 on the ultrasonic wand 200 transmits an infrared timing signal with each transmitted pulse shaped signal. It pulses an infrared timing signal that is synchronized with the transmitting of the ultrasonic signals to the ultrasonic receiver. The receiver 302 can include a photo diode 241 for determining when the infrared timing signal is received. In this case the communications port of the ultrasonic wand 200 is wirelessly coupled to the communications interface of the ultrasonic receiver 220 by way of the infrared transmitter and the photo diode for relaying the timing information to within microsecond accuracy (~1 mm resolution). The processor on the ultrasonic receiver 220 employs this infrared timing information to establish the first, second and third Time of Flight measurements with respect to a reference transmit time.

At step 306 the ultrasonic receiver 220 tracks the ultrasonic wand 200 by way of and relative to the ultrasonic receiver 220 during constrained rotational and translational bone movement at the first end from the paired transmit-receive ranges while the ultrasonic wand is positioned stationary, in proximity and in-sight of the ultrasonic receiver. The bone movement is constrained in the sense that when the bone (e.g., femur) is part of a joint (e.g., hip joint), one endpoint of the bone (e.g. proximal femur) is part of the joint and constrained to the dynamics of the joint, while the other end of the bone (e.g., distal femur) is more free to rotate and translate in three-dimensional space apart from the joint.

To resolve the position, referring back to FIG. 2A, the ultrasonic receiver 220 converts the time of flight and set of phase difference measurements calculated from each of the received ultrasonic signals at the three microphones 221-223 to three spatial points, and transforms the three spatial points to X, Y and Z rotations around the tip 207. This establishes the orientation of the ultrasonic wand 200. The ultrasonic receiver 220 determines the rotations with respect to its local coordinate system (at the origin); that is, local to the device. The ultrasonic receiver 220 thereafter applies a series of translations and rotations to map the ultrasonic wand's 200 coordinate system to its own local coordinate system. This transformation establishes an orientation of the ultrasonic wand 200 and positional location of the tip relative to the ultrasonic receiver 220. The mapping includes i) the ultrasonic wand 200 dimensions (e.g., 10×3×10 cm <w,l,h>) and component layout for the local coordinates of the transmitters and the tip 207 that are predetermined, and ii) the ultrasonic receiver 220 dimensions (e.g., 6×2×8 cm, <w,l,h>) and component layout for the local coordinates of the microphones and its coordinate origin that are predetermined.

The positional location is where the tip 207 is located in three-dimensional space with respect to an orientation of the ultrasonic wand 200. The positional location can be represented in Cartesian coordinates or polar coordinates. It can be the same point in three-dimensional space even though the wand orientation (e.g., tilt, rotation). The positional location identifies the tip 207 location relative to the second receiver 220 and the spatial coordinates of the three or more transmitters 201-203 relative to the coordinate system of the second receiver 220. It can be reported via sensory feedback, graphical or text display and/or audibly. One such example of sensory feedback via ultrasonic sensing and its principles of operation is taught in U.S. patent application Ser. No. 11/562,413 entitled "Method and System for Sensory Feedback" the entire contents of which are hereby incorporated by reference.

Briefly referring to FIG. 4A, one illustration is shown where the ultrasonic receiver 220 is attached to the distal endpoint of the bone 408. As previously indicated, it can be moved towards the pivot point 410 along the bone and attached. The wand 200 is positioned stationary in view of the ultrasonic receive 220 to establish a stationary reference point during while the ultrasonic receiver 220 is moving with the end of the bone. The pivot point 410 (e.g., hip ball and socket joint) constrains the bone 408 movement at the proximal end, but allows the distal end where the receiver 200 is located to rotate (e.g., twist) and translate (e.g., left, right, up, down, etc.) relative to the pivot point 410. As the distal end is moved in physical space, the receiver 220 tracks its movement relative to the stationary wand 200 and its own coordinate system.

Returning back to FIG. 3, at step 308, the ultrasonic receiver 220 calculates a three-dimensional displacement and orientation time trajectory of the ultrasonic wand 200 relative to the ultrasonic receiver 220 from the tracking of the ultrasonic wand and the time of flight and phase differential measurements. By saving its coordinate information to local memory, the ultrasonic receiver 220 then creates a hemispherical surface representing its displacement and orientation as a time trajectory with respect to the pivot point 410 as discussed in the next steps.

More specifically, the receiver 220 calculates a set of phase differences between the first sequence of ultrasonic Time of Flight (TOF) measurements and the second sequence of ultrasonic Time of Flight (TOF) measurements. A phase difference for each transmit-receiver pair is calculated for the set of phase differences. One such example of detecting phase differences is taught in U.S. patent application Ser. Nos. 11/562,410 and 11/146,445 the entire contents of which are hereby incorporated by reference. As one example, there are three phase differences for the ultrasonic signals sent from the transmitters 201-203 of the ultrasonic wand 200 to the receivers 221-223 of the ultrasonic receiver 220. The phase difference is a time difference between a first received ultrasonic signal and a second received ultrasonic signal at the same transmitter with respect to a phase of the first received ultrasonic signal.

At step 310, the ultrasonic receiver 220 generates the hemispherical surface representation of the constrained bone movement at the first end from the three-dimensional displacement and orientation time trajectory. The step of generating a hemispherical surface representation can further include calculating a least squares spherical fit of a locus of three-dimensional surface points produced from the tracking of the ultrasonic receiver during the constrained bone movement. The least squares sphere fit resolves a radial length of the bone and an origin of the pivot point relative to the ultrasonic receiver from the constrained bone movement.

Figure 4B:
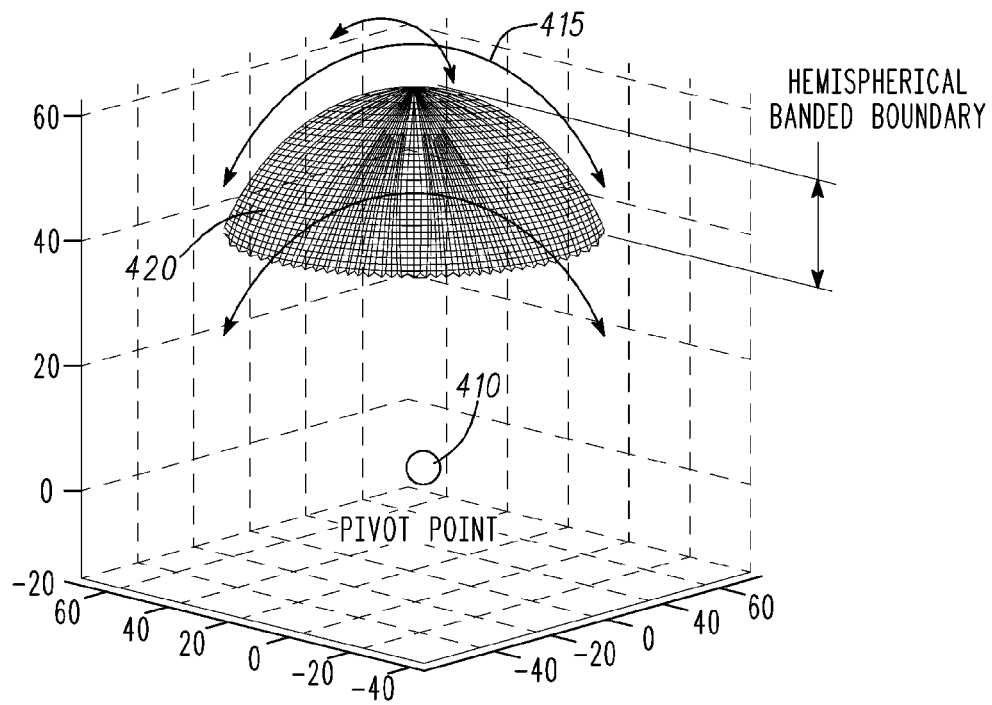
FIG. 4B is an illustration of a hemispherical surface representation produced in response to constrained movement about a pivot point in accordance with one embodiment.

Referring briefly to FIG. 4B, an illustration of the hemispherical surface 420 of the constrained bone movement 415 is shown, although in practice its representation may be scaled, volumetric, filled or further reaching. Although bone 408 is shown as a relatively straight leg bone (e.g., femur) that moves with respect to a relatively stationary knee or hip pivot point, it can also be a relatively straight arm bone (e.g., humerus) that moves with respect to a relatively stationary elbow or shoulder pivot joint. The hemispherical surface 420 approximates a half sphere with slight perturbations due to measurement and/or environmental noise (e.g., equipment) and conditions (e.g., humidity, temperature). It can be represented by parameters of a sphere in view of inaccuracies or unintentional movement of the pivot point, for example, if the patient's hip moves. The ultrasonic receiver 220 applies smoothing filters, time averaging, expectation-maximization and likelihood approaches and other adaptive, heuristic and metrology approaches to compressing the hemispherical surface variations to spherical parameters (e.g., radius, origin) for accurate modeling.

As previously noted, with respect to enhancing tracking accuracy for generating the hemispherical surface representation, the ultrasonic measurements can be weighted according to a relative location of the ultrasonic wand with respect to a location of the ultrasonic receiver. As part of an initialization, the ultrasonic receiver 220 creates a sound map of the acoustic propagation characteristics of the ultrasonic wand transmitters at a plurality of locations in physical space in proximity to the ultrasonic receiver. During operation, it then weights the time of flight and the phase differential measurements of the ultrasonic signals according to the sound map, where the sound map identifies transmission parameters of temperature, attenuation, frequency and phase.

Returning back to FIG. 3, at step 312, the ultrasonic receiver 220 calculates a pivot point of the second end of the bone from the hemispherical surface representation 420 of the constrained bone movement relative to a predetermined origin of the ultrasonic receiver at the first end of the bone. For example, briefly referring back to FIG. 4A, the ultrasonic receiver 220 has its own local coordinate system and origin, for instance, the physical center (0,0,0) of the ultrasonic receiver 220 itself. It identifies the location of the pivot point 410 relative to its own local coordinate system, made possible, by way of the ultrasonic wand 200 which establishes a stationary reference point for mapping the virtual coordinates of the hemispherical surface representation during movement of the ultrasonic receiver 200 at the distal end of the bone relative to the stationary pivot point 410. The method 400 can end after step 312 upon which the pivot point 410 is determined from the hemispherical surface representation.

Figure 5:
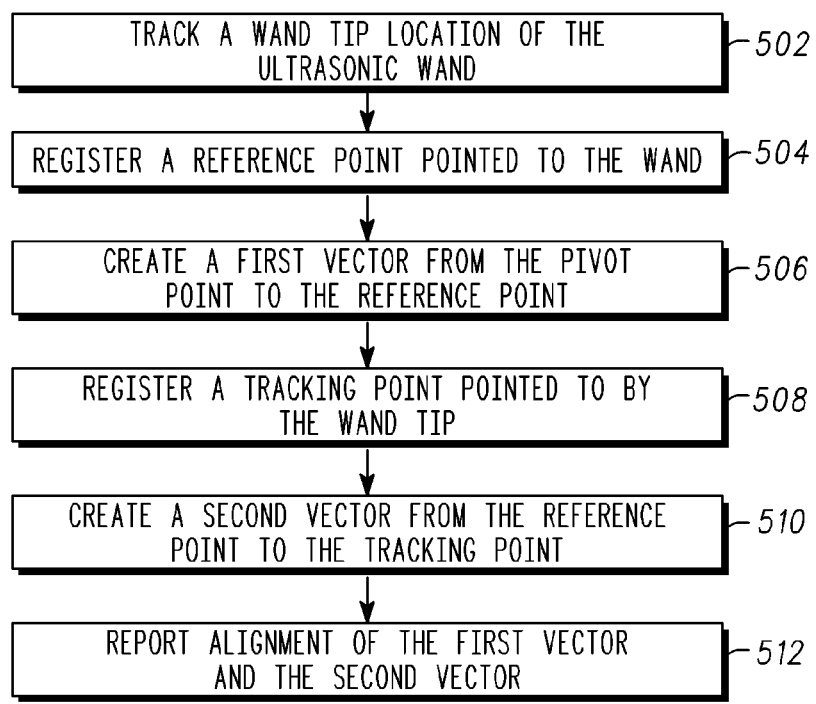
FIG. 5 is a method for determining alignment of two or more pointed locations with an anatomical pivot point in accordance with one embodiment.

Referring to FIG. 5 a method 500 for determining alignment with the anatomical pivot point is shown. The method 500 can continue the method steps shown in FIG. 3 as will be described below and within further practical context of the system illustration shown in FIG. 6. When describing the method 500, reference will be made to FIGS. 2A, 2B and 6 although the method 500 can be practiced in any other suitable system or device. Moreover, the steps of the method 500 are not limited to the particular order in which they are presented in FIG. 5. The inventive method can also have a greater number of steps or a fewer number of steps than those shown in FIG. 5.

At step 502, the ultrasonic receiver 602 tracks the wand tip of the ultrasonic wand 601, and its location, upon movement away from a stationary position. The wand tip does not require sensory electronics, transmitters or labeled markers affixed or attached thereon; its precise location is calculated from the location of the transmitters and wand geometry. The wand 602 is removed by the user from its stationary position upon determination of the pivot point (see FIG. 4A), at which time, it can be held in the user's hand to identify anatomical points of interest. At step 504 the ultrasonic receiver 602 registers a reference point, for example, on a bone, pointed to by way of the wand tip. The user can hold the wand 601 in one hand, and with a finger press the wand button to register the wand tip location at a reference point (B). The wand 601 communicates the button press via ultrasonic signaling, infrared signaling and/or other RF communications.

Figure 6:
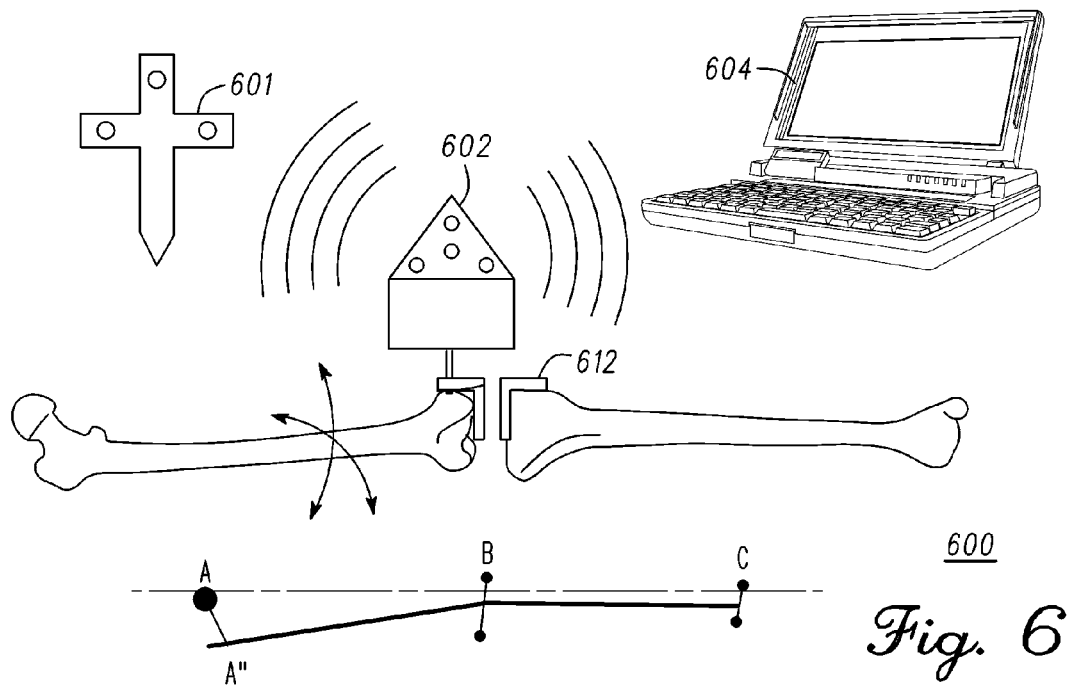
FIG. 6 is an illustration of a system for resolving an anatomical pivot point and reporting alignment therewith in accordance with one embodiment.

The receiver 602 in response to the button press captures ultrasonic signals transmitted by the wand transmitters and determines an orientation and translation of the wand 601, and correspondingly the location of the wand tip. Upon receipt and processing of the ultrasonic signals while the button is held down, the ultrasonic receiver 602 at step 506 creates a first vector from the pivot point (A) to the reference point (B) (see FIG. 6, line segment AB). This first vector is stored locally in memory as a direction and magnitude component in the ultrasonic in receiver 602. As previously indicated, the receiver 602 creates its own local coordinate system and its own origin. The first vector identifies the geometrical location of the wand tip at the reference point with respect to the receiver origin. As shown in FIG. 6, the first vector connects the femur head (point A) with the knee center (point B).

At step 508 the ultrasonic receiver 602 registers a tracking point on a second bone pointed to by way of the wand tip. In the illustration of FIG. 6, the second tracking point is the ankle center (point C) which can be geometrically determined from 2 or 3 wand tip registrations at the ankle and/or intra-operatively The ultrasonic receiver 602 can then create, at step 510, a second vector from the reference point to the tracking point. In the illustration of FIG. 6, the second vector connects the knee center (point B) with the ankle center (point C). These vectors can be shown on the display to permit the user visualization of the workflow for assessing alignment. At step 512 the ultrasonic receiver 602 reports alignment of the first vector and the second vector. The vector angle in one example can be efficiently determined by a cross product of the first and second vector, with further DSP optimizations such as parallel pipelined multiply accumulate operations. The alignment can be reported visually and/or numerically as a vector angle. All the processing can be performed on the user receiver 220 by way of the processor. The method 500 can end after step 512. It should be noted that the method 500 is extensible to more than two vectors and can report alignment for multiple vectors. For example, to further resolve alignment of the first vector AB and vector BC, the wand can identify a $B^1$ point on the distal end of the bone, and a $B^2$ point on the proximal end of the tibia, where the knee joint is formed. Alignment can then be reported for vector $AB^1$ and $B^2C$. Method 500 serves only as a minimum example for using the wand 601 and receiver 602 for determining alignment with a pivot point from multiple wand tip entries. Moreover, as seen ahead in method 700 of FIG. 7, acceleration information can be used to determine the pivot point and generate other vectors in support of determining overall alignment.

FIG. 6 depicts one exemplary embodiment of a system 600 using the ultrasonic wand 601 and the ultrasonic receiver 602, and employing the methods 300 of FIGS. 3 and 500 of FIG. 5 for positional measurement and alignment in orthopedic applications. As illustrated, the system 600 can be used to intra-operatively assess alignment ABC of the femur and tibia bones during surgery.

The wand 601 and receiver 602 are low cost disposable components that can be delivered in a sterilized package. The receiver 602 can communicate with the remote device 604 (e.g., laptop, computer, mobile device) to report wand tip location, positional information and an orientation of the wand 601 in real-time. The wand 601 and the receiver 602 communicate directly with one another without outside reliance on a supervisory system; that is, the receiver 602 can determine the location and orientation of the wand 601 within local view and with respect to its own coordinate system.

The wand 601 can be used to register points of interest in three-dimensional space with respect to the receiver 602; points of interest can be spatial locations, for example, anatomical or structural locations on a bone or structure 612. The wand 601 can also measure and report distance (e.g., mm, cm) between registered spatial points, for example, a gap distance between the distal femur and proximal tibia to determine a suitable sized insert. It can also be used to identify displacement, for example, an edge point or perimeter trace of an insert relative to its projected insertion location. The wand 601 can also thereafter be affixed at these locations to report rotations and translations of the underlying object (e.g., bone, jig, insert, prosthetic etc) at these points, for example, relative to a reference orientation. This also permits for full range tracking and reporting of kinematic behavior. Such information can be used during the surgery to report range of joint motion and for comparison of post-surgical results.

In another embodiment, the system 620 comprises the receiver 602 coupled to the jig 612, and the wand 601 to register points of interest on a first and second bone with respect to the jig 612. The receiver 602 and wand 601 employ ultrasonic sensing and tracking to determine the wand orientation and location relative to the receiver 602 and the jig 612. Based on the registered points of interest, the receiver 602 assesses and reports parameters related to the orientation of the jig 612 for making cuts to align the first and second bone. The wand tip locations and orientations can also be stored for reference on the receiver 602 and transmitted to the remote device 604. The system 620 can report alignment of the bones or jigs 612 by way of the wand 601 and the receiver 602 from these points of interest. The system 620 can assist in assessing alignment of the jigs 612 and bones for example, in knee replacement procedures. Software configurable parameters permit operation beyond the 3m application range shown.

In one example, alignment is achieved when the points of the femur head (A), knee center (B) and ankle (C) are positioned in a straight line as indicated by a positioning location of the wand tip 601 at the second locations at separate times. Femur head identification of point (A) can be determined by affixing the receiver 602 to the distal end of the femur and placing the wand 601 at a stationary location in view (e.g., 1 m distance from receiver 602). The femur is then rotated in a pattern for approximately 10-20 seconds to resolve the spherical center (femur head) as described in pending Provisional Patent Application No. 61/291,725 while the hip is sufficiently still. Upon establishing point A, the wand tip is then used to register the knee center (e.g., distal femur center) point B when the leg is in flexion. Other anatomical locations can be registered from providing further alignment information, for example, the proximal tibia. Thereafter, the wand tip is used to register the medial malleolus and the lateral malleolus which establishes the ankle center C (e.g., eq: center=0.6*medial<x,y,z>)+0.4*lateral<x,y,z>).

Once these three (or more) points A, B and C are registered, the wand 601 can be affixed midway on the tibia and in view of the receiver 602. This permits real-time tracking of the tibia relative to the femur bone when the leg is in extension (straight) or in flexion (bent). In this fixed relationship, the Receive 602 can track a position and orientation of the wand 601 relative to the receiver's own coordinate system which inherently reveals any rotations and translations of the tibia relative to the femur (e.g., axial twist, left-right, up-down, forward-backward, and combinations thereof). As noted previously, this permits the system 620 to track and report a range of motion and associated kinematic information (e.g., axial twist, rotations, alignment) in accordance with a patient's expected orthopedic behavior during the procedure.

Certain aspects of alignment preparation can be performed pre-surgery; for example, calibrating the receiver 602 to the jig 612 or wand 601. It can also transmit the positional information to associated wireless devices (e.g., laptop, cell phone, net book) like the remote system 604 and upload the information to a server on a network for example one connected to electronic medical or health care records. The system 620 can assess and report in real-time the position of these points for determining alignment, or other registered points, by way of a graphical user interface on the communication device 604.

Figure 7A:
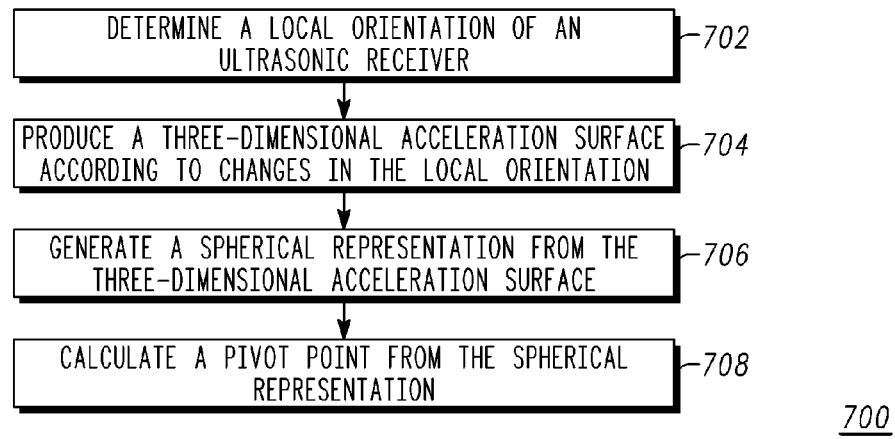
FIG. 7A is a method for determining via acceleration an anatomical pivot and alignment therewith in accordance with one embodiment.

Referring to FIG. 7A a method 700 for determining an anatomical pivot point and alignment therewith based on acceleration is shown according to one embodiment. When describing the method 700, reference will be made to FIGS. 2A, 2B, 4A and 7B although the method 700 can be practiced in any other suitable system or device. Moreover, the steps of the method 700 are not limited to the particular order in which they are presented in FIG. 7A. The method can also have a greater number of steps or a fewer number of steps than those shown in FIG. 7A.

The method 700 can start in a state as shown in the illustration of FIG. 4B just prior to pivot point determination where the ultrasonic receiver 220 is on the distal end of the bone 408. The wand 200 is not required for determining the pivot point 410 since it may be resolved on acceleration alone, though it can be incorporated for improving accuracy of the pivot point. The wand 200 is used for alignment measurements after pivot point determination.

Figure 7B:
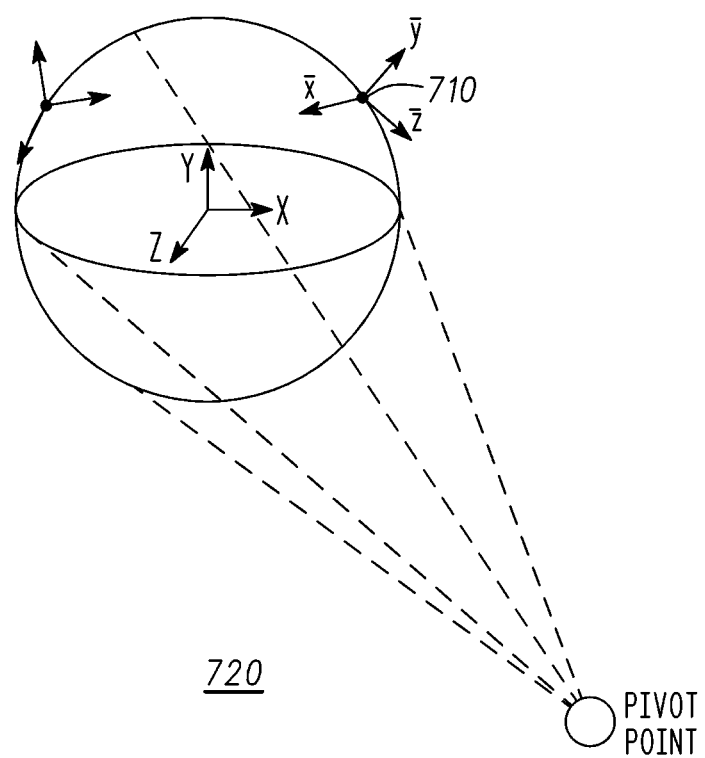
FIG. 7B is an illustration of an acceleration surface in accordance with one embodiment.

At step 702, the ultrasonic receiver 220 determines its own local orientation in orthogonal <x,y,z> axes by way of the local accelerometer. The local orientation is determined on a time-out of the ultrasonic receiver being stationary, for example, when the leg is held momentarily still. At step 704, responsive to constrained movement of the leg bone 408 around the pivot point 410, the ultrasonic receiver 220 produces a three-dimensional acceleration surface according to changes in a local orientation of an ultrasonic receiver due to acceleration. FIG. 7B shows a three-dimensional acceleration surface comprising local accelerations 710. The local accelerations are along the hemispherical surface and indicate acceleration in x, y and z directions according to movement during constrained bone movement.

Returning back to FIG. 7A, at step 706, the receiver 220 generates a hemispherical surface representation of constrained rotational and translational movement at the first end from the three-dimensional acceleration surface. FIG. 4B shows an example of a hemispherical surface 420 representation. Notably, the surface 420 can be generated by the current method 700, with acceleration sensing, or via positional sensing with the ultrasonic wand 200 and ultrasonic receiver 220 as explained in method 300; both methods can be combined to further resolve and enhance the accuracy, for example, to compensate for accelerometer drift or ultrasonic environment deviations.

The acceleration data is used in conjunction with the ultrasonic positional measurements to determine the receiver orientation and compensate for axial rotation due to the femur neck (segment AA') during the constrained movement of the femur head. For example, referring to FIG. 6, the femur neck line segment AA' causes a second degree of freedom around the axial line segment AB directly connecting the femur neck and knee center. The ultrasonic receiver keeps track of its local orientation with respect to gravity and its relative orientation with respect to the stationary wand 200. In an ideal situation, the bone is constrained to rotational and translational movement without imparting axial twist, but there is generally some inherent twisting motion. This also applies when the arm bone is the humerus with humerus head. The receiver 200 applies a counter rotational transform to its local orientation with respect to the coordinate system with the wand based on the receivers local orientation with respect to gravity via its accelerometer.

At step 708, the receiver 220 calculates, relative to the ultrasonic receiver, a pivot point of the bone at the second end from the hemispherical surface representation of the three-dimensional acceleration surface. More specifically, it calculates a least squares spherical fit of the acceleration surface for each of the three or more transducers, determines an intersection of the least squares spherical fit representing each of the three or more transducers, and resolves a radial length of the bone and an origin of the pivot point from the intersection. The least squares sphere fit resolves a radial length of the bone and an origin of the pivot point relative to the ultrasonic receiver from the constrained movement The method 700 of determining the pivot point ends at step 708. In a second embodiment, the method 700 continues to report alignment of one or more points with the pivot point by way of the wand 200. Briefly, the wand 200 can couple the local receiver coordinate system of the receiver 200 to points in physical space. The wand 200 which also has an accelerometer can establish its own local wand coordinate system. The ultrasonic positional sensing permits a geometric coupling of the two local coordinate systems. Although the wand is based on ultrasonic sensing, it can also employ Electromagnetics (EM) to provide positional sensing.

The method can further include directing the ultrasonic wand to transmit ultrasonic signals by way of three or more ultrasonic transducers located thereon, determining time of flight and phase differential measurements of the transmitted ultrasonic signals at the ultrasonic receiver, and tracking a wand tip location of the ultrasonic wand that is in proximity and in-sight of the ultrasonic receiver. The ultrasonic receiver 220 registers a reference point on the bone pointed to by way of the wand tip, creates a first vector from the pivot point to the reference point, identifies a tracking point on a second bone by way of the ultrasonic wand, creates a second vector from the distal point to the tracking point, and reports alignment of the first vector and the second vector.

Upon reviewing the aforementioned embodiments, it would be evident to an artisan with ordinary skill in the art that said embodiments can be modified, reduced, or enhanced without departing from the scope and spirit of the claims described below. For example, the receiver by way of accelerometer measurements can create a femur vector from the determined pivot point to a registered knee center, and a tibial wand can be used to create one or more tibia vectors on the tibia by accelerometer measurements alone rather than manually using the wand to register the ankle center. The wand can be affixed to the mid tibia to capture tibia orientation and generate the tibia vectors. Similarly the receiver can be attached to the distal femur to capture its orientation and generate the femur vectors relative to the determined pivot point. A second wand in communication with the affixed receiver can then be used to virtually connect the tibia vectors and the femur vectors at the knee center to assess overall alignment. Furthermore, this second wand can be coupled to a cutting jig for orienting the cutting jig for directing cuts on the distal femur and proximal tibia according to a desired alignment and workflow procedure.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed, is:

1. A method for determining an anatomical pivot point and alignment therewith, the method comprising the steps of:
   transmitting ultrasonic signals from an ultrasonic wand to an ultrasonic receiver, where the ultrasonic receiver is attached to a first end of a bone, the bone comprises two ends, and a second end of the bone is sufficiently stationary;
   determining paired transmit-receive ranges between the ultrasonic wand and the ultrasonic receiver by weighted time of flight and phase differential measurements of the ultrasonic signals captured and processed at the ultrasonic receiver;
   tracking the ultrasonic wand by way of, and relative to, the ultrasonic receiver during constrained rotational and translational movement at the first end from the paired transmit-receive ranges while the ultrasonic wand is positioned stationary, in proximity and in-sight of the ultrasonic receiver;
   calculating a three-dimensional displacement and orientation time trajectory of the ultrasonic wand relative to the ultrasonic receiver from the tracking of the ultrasonic, wand and the time of flight and phase differential measurements;
   generating a hemispherical surface representation of the constrained movement at the first end of the bone from the three-dimensional displacement and orientation time trajectory; and
   calculating a pivot point of the second end of the bone from the hemispherical surface representation of the constrained movement relative to a predetermined origin of the ultrasonic receiver at the first end of the bone.

2. The method of claim 1, where the ultrasonic receiver further performs the steps of:
   tracking a wand tip location of the ultrasonic wand upon movement away from the stationary position;
   registering a reference point on the bone pointed to by way of the wand tip;
   creating a first vector from the pivot point to the reference point;
   registering a tracking point on a second bone pointed to by way of the wand tip;
   creating a second vector from the reference point to the tracking point; and
   reporting alignment of the first vector and the second vector,
   where the wand tip has no sensory electronics, transmitters or labeled markers affixed or attached thereon.

3. The method of claim 1, wherein the step of generating a hemispherical surface representation comprises calculating a least squares spherical fit of a locus of three-dimensional surface points produced from the tracking of the ultrasonic receiver during the constrained movement.

4. The method of claim 3, wherein the the east squares sphere fit resolves a radial length of the bone and an origin of the pivot point relative to the ultrasonic receiver from the constrained movement, where the bone is:
   an arm bone that moves with respect to a relatively stationary elbow or shoulder pivot joint, or
   a leg bone that moves with respect to a relatively stationary knee or hip pivot point.

5. The method of claim 1, further comprising weighting a direct time of flight and phase differential measurements according to a relative location of the ultrasonic wand with respect to a location of the ultrasonic receiver.

6. The method of claim 1, further comprising:
   synchronizing a transmit pulsing of the ultrasonic signals transmitted at the ultrasonic wand and
   incorporating timing of the synchronized transmit pulsing for determining the time of flight and phase differentials.

7. The method of claim 6, comprising periodically transmitting an optical pulse from a transmitter to the receiver to establish a synchronized and periodic time reference for the time of flight and the phase differential measurements.

8. The method of claim 1, comprising:
   creating a sound map of the acoustic propagation characteristics of the-ultrasonic wand transmitters at a plurality of locations in physical space in proximity to the ultrasonic receiver; and
   weighting the time of flight and the phase differential measurements of the ultrasonic signals according to the sound map,
   where the sound map identifies transmission parameters of temperature, attenuation, frequency and phase.

9. A method for determining an anatomical pivot point and alignment therewith, the method comprising the steps of:
   producing a three-dimensional acceleration surface according to changes in a local orientation of an ultrasonic receiver due to acceleration,
   where the ultrasonic receiver is attached to a first end of a bone, the bone comprises two ends, and a second end of the bone is sufficiently stationary;
   generating a hemispherical surface representation of constrained rotational and translational movement at the first end from the three-dimensional acceleration surface; and
   calculating, relative to the ultrasonic receiver, a pivot point of the bone at the second end from the hemisphencai surface representation of the three-dimensional acceleration surface.

10. The method of claim 9, where the ultrasonic receiver further performs the steps of:
- directing an ultrasonic wand to transmit ultrasonic signals by way of three or more ultrasonic transducers located thereon;
- determining time of flight and phase differential measurements of the transmitted ultrasonic signals at the ultrasonic receiver; and
- tracking a wand tip location of the ultrasonic wand that is in proximity and in-sight of the ultrasonic receiver.

11. The method of claim 10, where the ultrasonic receiver performs the steps of:
- registering a reference point on the bone pointed to by way of the wand tip;
- creating a first vector from the pivot point to the reference point;
- identifying a tracking point on a second bone by way of the ultrasonic wand;
- creating a second vector from a distal point to the tracking point; and
- reporting alignment of the first vector and the second vector, where the wand tip has no sensory electronics, transducers, or labeled markers affixed or attached thereon.

12. The method of claim 9, comprising
- calculating a least squares spherical fit of the acceleration surface for each of a plurality of three or more transducers;
- determining an intersection of the least squares spherical fit representing each of the three or more transducers; and
- resolving a radial length of the bone and an origin of the pivot point from the intersection.

13. A system for determining an anatomical pivot point and alignment therewith, the system comprising:
- an ultrasonic wand including:
  - three or more ultrasonic transmitters to transmit ultrasonic signals through air;
  - an electronic circuit to generate and shape driver signals to the three or more ultrasonic transmitters for producing the ultrasonic signals;
  - an interface to receive user input for registering a wand tip location of the ultrasonic wand,
  - a communications port to relay the user input and or receiving timing information to control the electronic circuit; and
  - a battery to power the electronic circuit and associated electronics,
  - where the wand tip has no sensory electronics, transmitters or labeled markers affixed or attached thereon, and
- an ultrasonic receiver including:
  - a processor to generate timing information, track hemispherical movement of the ultrasonic receiver from the timing information, and resolve a pivot point of the hemispherical movement when the ultrasonic wand is in proximity;
  - a communications interface to transmit the timing information to the ultrasonic wand that in response transmits the ultrasonic signals;
  - three or more microphones to receive the ultrasonic signals transmitted through the air.
  - a memory to store received ultrasonic signals to produce a history of received ultrasonics signals,
  - a wireless communication interface to wirelessly convey positional information and alignment of pointing locations to a remote system; and
  - a battery to power the processor and associated electronics,
  - where the processor selectively references the history of stored ultrasonic signals to track the hemispherical movement of the ultrasonic receiver over time.

14. The system of claim 13, where the processor:
- directs the ultrasonic wand to transmit the ultrasonic signals, where the ultrasonic receiver is configured to be attached to a first end of a bone, the bone comprises two ends, and a second end of the bone is sufficiently stationary;
- determines paired transmit-receive ranges between the ultrasonic wand and the ultrasonic receiver by weighted time of flight and phase differential measurements of the ultrasonic signals captured and processed at the ultrasonic receiver;
- tracks the ultrasonic wand by way of, and relative to, the ultrasonic receiver during constrained rotational and translational movement of the first end of the bone from the paired transmit-receive ranges while the ultrasonic wand is positioned stationary, in proximity and in-sight of the ultrasonic receiver; and
- registers a pointing location of the wand tip responsive to the user input, and determines an alignment of the pivot point and two or more registered wand tip locations.

15. The system of claim 14, where the processor:
- calculates a three-dimensional displacement and orientation time trajectory of the ultrasonic wand relative to the ultrasonic receiver from the tracking of the ultrasonic wand and the time of flight and phase differential measurements;
- generates a hemispherical surface representation of the movement at the first end of the bone from the three-dimensional displacement and orientation time trajectory; and
- calculates the pivot point of the second end of the bone from the hemispherical surface representation of the movement relative to a predetermined origin of the ultrasonic receiver at the first end of the bone, where the bone is:
- a leg bone that is relatively straight with respect to a hip pivot point, or
- an arm bone that is relatively straight with respect to a shoulder pivot joint.

16. The system of claim 13, where the processor:
- synchronizes a transmit pulsing of the ultrasonic signals at the ultrasonic wand; and
- determines the time of flight and phase differentials from the synchronized transmit pulsing.

17. The system of claim 13, where the ultrasonic wand includes:
- an infrared transmitter that pulses an infrared timing signal that is synchronized with the transmitting of the ultrasonic signals to the ultrasonic receiver,
- where the ultrasonic receiver includes a photo diode for detecting the infrared signal and establishing a transmit time of the ultrasonic signals to permit wireless infrared communication there between.

18. The system of claim 13, where the communications interface of the ultrasonic receiver includes a wireless communication channel operating via BlueTooth, Zig-Bee or Radio Frequency.

19. The system of claim 13, where the ultrasonic receiver includes:
- an accelerometer to determine a local orientation relative to the ultrasonic wand, where the ultrasonic receiver is configured to be attached to a first end of a bone, the bone comprises two ends, and a second end of the bone is sufficiently stationary, and the processor:

produces a three-dimensional acceleration surface according to changes in the local orientation of the ultrasonic receiver due to acceleration;

generates a hemispherical surface representation of the movement at the first end of the bone in three-dimensions from the three-dimensional acceleration surface; and calculates, relative to the ultrasonic receiver, a pivot point of the bone at the second end from the hemispherical surface representation of the three-dimensional acceleration surface.

20. The system of claim 19, where the ultrasonic receiver directs the ultrasonic wand to transmit ultrasonic signals by way of the three or more ultrasonic transducers located thereon;

determine time of flight and phase differential measurements of the transmitted ultrasonic signals at the ultrasonic receiver;

tracks a wand tip location of the ultrasonic wand that is in proximity and in-sight of the ultrasonic receiver to register two or more points of interest; and reports alignment of the pivot point and the two or more points of interest.

* * * * *